United States Patent Office 3,030,415
Patented Apr. 17, 1962

3,030,415
SEPARATION OF ORTHO-NITROTOLUENE FROM NITROTOLUENE MIXTURES
Ellis K. Fields, Chicago, Ill., assignor to Standard Oil Company, Chicago, Ill., a corporation of Indiana
No Drawing. Filed May 14, 1958, Ser. No. 735,108
4 Claims. (Cl. 260—524)

This invention relates to a process for the preparation of para-nitrobenzoic acid. More particularly it relates to a process for the selective oxidation of isomeric mixtures of nitrotoluenes with molecular oxygen for the preparation of para-nitrobenzoic acid.

Para-nitrobenzoic acid has been prepared by nitration of toluene, separation of the para-nitrotoluene and oxidation thereof with conventional chemical oxidants such as sodium dichromate, potassium permanganate, manganese dioxide, nitric acid and the like. The use of such chemical oxidants, however, is uneconomical because of the high cost of the oxidizing agents, and further often leads to undesirable impurities in the final product. Thus the use of nitric acid for the oxidation of aromatic compounds invariably leads to formation of undesirable nitrobodies in the product because of the readiness with which aromatic rings nitrate in the presence of nitric acid of sufficient strength to serve as a useful oxidizing agent.

The oxidation of organic compounds is preferably effected by direct reaction of the feedstock with molecular oxygen, e.g. air, which is the cheapest source of oxygen available and which does not introduce undesirable reaction by-products. In co-pending application Serial No. 732,797 of Alfred Saffer and Robert S. Barker, filed May 5, 1958, there is disclosed a process for the oxidation of a member of the group consisting of meta-nitrotoluene and para-nitrotoluene to produce the corresponding nitrobenzoic acids. By this process, which employs molecular oxygen as the oxidant together with a catalyst comprising in conjoint presence bromine and a heavy metal oxidation catalyst, high yields of meta and para-nitrobenzoic acids are readily obtained.

I have now unexpectedly found that while meta and para-nitrotoluene are readily oxidized by means of molecular oxygen in the presence of bromine and a heavy metal oxidation catalyst, the corresponding ortho isomer, namely ortho-nitrotoluene, is unexpectedly resistant to oxidation by this process. It is particularly surprising that ortho-nitrotoluene does not oxidize in this process, since there is no difficulty observed in chemical oxidation of ortho-nitrotoluene. For example, potassium dichromate and sulfuric acid have been employed to give high yields of ortho-nitrobenzoic acid (see Org. Chem. Ind. (U.S.S.R.), 7, p. 379 (1940)) and similar results have been obtained with boiling aqueous permanganate e.g. as reported by M. Boetius, Berichte Deutsche Chemische Gesellschaft (Ber., 68B, p. 1924 (1935)).

An object of my invention therefore is to provide a process for selective oxidation of a mixture of isomeric nitrotoluenes to prepare para-nitrobenzoic acid of high purity. A further object is to provide a process for the selective oxidation by means of molecular oxygen of a mixture of para-nitrotoluene and ortho-nitrotoluene containing minor proportions of meta-nitrotoluene to prepare para-nitrobenzoic acid. Another object of my invention is to provide a process for the preparation of para-nitrobenzoic acid from an isomeric mixture of mono-nitrotoluenes obtained by nitration of toluene which avoids prior separation and purification of the nitrotoluene isomers. A further object is to provide an oxidation process employing a solvent medium from which para-nitrobenzoic acid can be obtained directly and in high yield and high purity. These and other objects of my invention will be apparent from the ensuing description thereof.

In accordance with the process of my invention, isomeric mixtures of nitrotoluenes containing para-nitrotoluene together with ortho-nitrotoluene are reacted with molecular oxygen in the liquid phase in the presence of a lower saturated aliphatic monocarboxylic acid solvent and in the presence of a catalyst comprising in conjoint presence bromine and a heavy metal oxidation catalyst.

As feedstocks to the present process are employed isomeric mixtures of nitrotoluenes, which are readily obtained by the mono-nitration of toluene in accordance with methods well known in the art. Such mixtures generally contain 30–70% by weight of para-nitrotoluene, 70–30% by weight ortho-nitrotoluene and from 0 to about 10% by weight of meta-nitrotoluene. Typically mono-nitration of toluene results in a product consisting of about 55–60% of ortho-, about 40% of para- and about 3% of meta-nitrotoluene. Mixtures of nitrotoluenes containing higher concentrations of para-nitrotoluene within the indicated range can be obtained by controlled nitration of toluene under specific conditions known to the art or by fractional distillation of the usual nitration mixture, a part of the ortho-nitrotoluene being distilled overhead so as to obtain a residual mixture of ortho, meta and para-nitrotoluene containing, for example, up to about 90% para-nitrotoluene. Such residual mixtures containing ortho and para-nitrotoluene isomers can likewise be effectively employed as feedstocks in the present process.

In the practice of the invention, isomeric mixtures of nitrotoluenes containing para and ortho-nitrotoluene are reacted with molecular oxygen, e.g. air, in the liquid phase in the presence of a catalyst comprising in conjoint presence bromine and a heavy metal oxidation catalyst. The oxidation is conducted under liquid phase conditions in the presence of an oxidation resistant reaction medium in which the organic reactants are soluble or suspended. As such inert reaction media may be employed materials which are substantially inert to oxidation and which facilitate carrying out the reaction and recovering the desired para-nitrobenzoic acid. Desirably the added medium is a lower saturated aliphatic monocarboxylic acid containing 2 to 8 carbon atoms in the molecule, preferably from 2 to 4 carbon atoms, and especially acetic acid. Mixtures of such acids may be used. When all the advantages of an acid medium are not required, other inert media may be used, such as benzene, carbon tetrachloride, chlorinated hydrocarbon such as chlorinated benzenes or chlorinated naphthalenes and the like, or mixtures thereof with acetic acid or other lower aliphatic monocarboxylic acids.

Where the lower aliphatic monocarboxylic acid medium is used, it is generally not necessary to use large amounts thereof. Such acids in the range of 0.1 to 10 parts by weight, desirably 0.5 to 4 and preferably about 1 to about 2.5 per part of aromatic material have been found adequate. The amount of solvent employed is selected with a view to facilitating the oxidation reaction and recovery of the oxidation products. In the oxidation of mixtures of isomeric nitrotoluenes to produce para-nitrobenzoic acid the lower carboxylic acids such as acetic acid, propionic acid, butyric acid and the like, offer particular advantages as solevnts since pure para-nitrobenzoic acid may be readily crystallized from the reaction mixture, unconverted nitrotoluenes and minor amounts of meta-nitrobenzoic acid remaining dissolved in the mother liquors.

As the heavy metal ovidation catalyst there may be employed catalysts which have heretofore been employed for accelerating the oxidation of organic compounds, such as the polyvalent metals having atomic weights between about 50 and 200. Of the heavy metal group, those metals having an atomic number from 23 to 28 including vanadium, chromium, manganese, iron, cobalt and nickel are particularly useful as catalysts. Mixtures of such metals may be employed. Particularly excellent results are obtained with a metal of the group consisting of manganese, cobalt and mixtures thereof.

The metal catalyst may be added in elemental, combined or ionic form, for example as the free metal, as the oxide or hydroxide, or in the form of metal salts. For example, the metal manganese may be supplied as the manganese salt of a lower aliphatic carboxylic acid, such as the acetate, as the salt of a fatty acid or other organic acid, such as manganese naphthenate, or in the form of an organic complex such as the acetylacetonate, 8-hydroxy-quinolinate, or the like, as well as inorganic manganese salts such as the borates, halides, nitrates, etc.

The bromine may similarly be added in elemental, combined or ionic form. Satisfactory results are obtained with, for example, elemental bromine, inorganic bromine containing compounds such as hydrogen bromide, ammonium bromide, potassium bromide, potassium bromate and the like, or organic bromine containing compounds including tetrabromoethane, benzyl bromide and the like. The bromine compounds may be soluble or partially soluble in the reaction medium.

Illustratively, the catalyst may be a heavy metal bromide, for example, manganese bromide, and may be added as such or by means of materials which provide a catalytic amount of heavy metal and of bromine to the reaction system. The amount of catalyst, for example of manganese and bromine, calculated as $MnBr_2$ may be in the range of about 0.1 to about 10 percent by weight of the aromatic reactant charged, desirably 0.3 to 2 and preferably 0.5 to 1.5 percent. Mixtures of materials may be used, and the proportions of heavy metal oxidation catalyst and bromine may be varied from their stoichiometric properties encountered in heavy metal bromides such as $MnBr_2$, for example in the range of about 1 to 10 atoms of heavy metal per atom of bromine to about 1 to 10 atoms of bromine per atom of heavy metal.

In order to illustrate the relative reactivity of the various isomeric nitrotoluenes in the oxidation system described above, the following procedure was employed.

A series of oxidation runs was conducted in which 50 g. of a single nitrotoluene isomer, 150 g. glacial acetic acid, 0.6 g. of a mixture of manganese acetate and cobalt acetate (as the tetrahydrates) and 1.0 g. of ammonium bromide was charged to a tubular reactor fitted with a stirrer, gas inlet means, reflux condenser and valved gas outlet to control the exit flow of gas. The reactor was heated to 204–210° C. and air pressured in through a sparger beneath the liquid surface, the reactor pressure being maintained at 400 p.s.i.g. The rate of air flow was 3–3.5 liters/minute and the reaction period 70–80 minutes, the reaction being terminated when analysis of the exit gases indicated no further oxygen absorption.

In the following table, the results obtained in oxidation of the individual isomeric nitrotoluenes is given:

TABLE

| Nitrotoluene | Nitrobenzoic Acid (gms.) | Yield, percent | Percent Nitrotoluene Recovered |
| --- | --- | --- | --- |
| Para | 52 | 86 | |
| Meta | 59.2 | 97 | |
| Ortho | 0 | 0 | 94 |

As can be seen from the above table, ortho-nitrotoluene differs radically from the other nitrotoluene isomers with respect to oxidizability with molecular oxygen in the presence of the heavy metal-bromine oxidation catalyst. The essentially complete stability of ortho-nitrotoluene to oxidation in this system provides the basis for one aspect of the present invention, which is illustrated by the following non-limiting examples.

*Example 1*

A mixture of nitrotoluenes containing 55.0 g. (0.4 mole) para-nitrotoluene and 27.4 g. (0.2 mole) ortho-nitrotoluene in 150 g. glacial acetic acid together with 6 ml. aqueous solution containing 0.2 g. cobalt acetate tetrahydrate, 0.4 g. manganese acetate tetrahydrate and 1.0 g. ammonium bromide was charged to a tubular reactor provided with gas inlet means, reflux condenser and valved gas outlet to control the exit flow of gas. The reactor was heated to 213–215° C. and pressured to 400 p.s.i.g. Air under pressure was then passed through the reactor contents at the rate of 3.1 liters/minute, the reactor temperature and pressure being maintained at 213–215° C. and 400 p.s.i.g. Oxidation was continued for 63 minutes. The reactor contents were cooled and filtered, the solids washed with cold acetic acid and dried, yielding 27.2 g. of substantially pure para-nitrobenzoic acid having a melting point of 236–239° C. and a neutral equivalent of 169. The filtrate and washings were distilled, giving as distillate 24 g. ortho-nitrotoluene and 17.2 g. of unconverted para-nitrotoluene containing some ortho-nitrotoluene. The distillation residue, 14.9 g., was extracted with 5% aqueous potassium carbonate, filtered and the filtrate acidified and filtered. An additional 7.2 g. of para-nitrobenzoic acid was recovered together with 7.4 g. of unconverted para-nitrotoluene. The overall yield of p-nitrobenzoic acid was 92%, the conversion 63.0 wt. percent based on the weight of p-nitrotoluene charged, and the recovery of charged ortho-nitrotoluene about 90 wt. percent.

*Example 2*

A mixture of nitrotoluene containing 80 g. para-nitrotoluene, 12 g. ortho-nitrotoluene and 8 g. meta-nitrotoluene in 150 g. glacial acetic acid together with the same catalyst charge used in Example 1 was oxidized in similar manner with air at 215° C. and 400 p.s.i.g. After airflow had continued for 80 minutes, the reactor contents were cooled to 25° C. and filtered. The solids were washed with 20 cc. of cold acetic acid and dried, giving 78 g. (82% yield) of p-nitrobenzoic acid melting at 234–237° C. and having a neutral equivalent of 168.6.

In order to determine how pure the product of Example 2 was, a synthetic mixture comprising 1% by weight meta-nitrobenzoic acid and 99% para-nitrobenzoic acid was prepared, and the melting point of the mixture determined. The synthetic mixture melted over the range 204–220° C., compared to the 234–237° C. melting point of the product of Example 2. It is thus apparent that this product contained considerably less than 1% by weight of meta-nitrobenzoic acid as a contaminant, further indicative of the added advantages resulting from the use of a lower aliphatic monocarboxylic acid as the solvent in which to conduct the oxidation.

Desirable or comparable results can be achieved with various modifications of the process described and exemplified hereinbefore. Thus the temperaure can be in the range of about 120° C. to about 275° C., desirably between about 150° to about 250° C. The reaction temperature should be sufficiently high so that the desired oxidation reaction occurs, yet not so high as to cause undesirable charring or formation of tars. The reaction time should be sufficient to obtain a desirable conversion of the substituted aromatic material to the desired nitrobenzoic acid, e.g. in the range of about 0.5 to about 25 hours, preferably up to about 4 hours.

The process of the present invention is conducted under essentially liquid phase conditions, and the relation of temperature and pressure is so regulated as to provide a liquid phase in the reaction zone. Generally, the pressure may be in the range of atmospheric to about 1500 p.s.i.g., preferably between about 200–600 p.s.i.g., the pressure being sufficient at the operating temperature to maintain all or a part of the organic reactant and/or solvent in the liquid phase.

The molecular oxygen employed may be in the form of substantially 100% oxygen gas or in the form of gaseous mixtures containing lower concentrations of oxygen, for example air, air enriched with oxygen, or mixtures of oxygen and other gases inert with respect to the oxidation.

The particular solvent employed, catalyst, catalyst concentration, time, temperature and the like are interrelated variables, and may be varied within the broad ranges hereinbefore indicated. Lower temperatures may, for example, be indicated where a more highly concentrated source of molecular oxygen is employed in lieu of air, for example pure oxygen or mixtures of oxygen and inert gas containing 50% or more by volume of molecular oxygen.

In view of the foregoing disclosures, variations and modifications of the invention will be apparent to those skilled in the art, and it is intended to include within the invention all such variations and modifications except as do not come within the scope of the appended claims.

I claim:

1. A process which comprises reacting a mixture consisting essentially of ortho-nitrotoluene and para-nitrotoluene with molecular oxygen in the presence of from 0.1 to about 10 parts by weight of a lower saturated aliphatic monocarboxylic acid per part of nitrotoluene and in the presence of a catalyst comprising in conjoint presence bromine and a heavy metal oxidation catalyst, effecting said reaction at a temperature of from about 120° C. to about 275° C. and a pressure of 0 to 1500 p.s.i.g. whereby para-nitrotoluene is selectively oxidized to para-nitrobenzoic acid, recovering said acid and recovering unconverted nitrotoluenes containing substantially all of the ortho-nitrotoluene contained in said mixture.

2. A process as defined in claim 1 wherein the heavy metal has an atomic number of 23 to 28 inclusive.

3. A process as defined in claim 1 wherein the bromine is present in an amount of from about 0.1 to about 10 atoms per atom of heavy metal.

4. The process of claim 1 wherein acetic acid is employed as the solvent.

References Cited in the file of this patent

UNITED STATES PATENTS

| | | |
|---|---|---|
| 2,245,528 | Loder | June 10, 1941 |
| 2,815,373 | Mayurnik | Dec. 3, 1957 |
| 2,833,816 | Saffer et al. | May 6, 1958 |

OTHER REFERENCES

Ohta et al.: Chemical Abstracts, vol. 51, col. 281–2, January 1957. (Copy in Library.)